(12) United States Patent
Griffith

(10) Patent No.: US 10,513,283 B2
(45) Date of Patent: Dec. 24, 2019

(54) MOTORIZED KAYAK CART

(71) Applicant: Mark Griffith, Navarre, FL (US)

(72) Inventor: Mark Griffith, Navarre, FL (US)

( * ) Notice: Subject to any disclaimer, the term of this patent is extended or adjusted under 35 U.S.C. 154(b) by 0 days.

(21) Appl. No.: 15/798,892

(22) Filed: Oct. 31, 2017

(65) Prior Publication Data

US 2019/0126966 A1 May 2, 2019

(51) Int. Cl.
| | |
|---|---|
| *B62B 5/00* | (2006.01) |
| *B60P 3/10* | (2006.01) |
| *B62B 3/02* | (2006.01) |
| *B62B 3/10* | (2006.01) |
| *B63C 13/00* | (2006.01) |
| *B62B 1/00* | (2006.01) |

(52) U.S. Cl.
CPC ............. *B62B 5/0033* (2013.01); *B60P 3/10* (2013.01); *B62B 1/008* (2013.01); *B62B 3/025* (2013.01); *B62B 3/102* (2013.01); *B62B 5/0046* (2013.01); *B62B 5/0076* (2013.01); *B63C 13/00* (2013.01); *B62B 2202/403* (2013.01)

(58) Field of Classification Search
CPC ... B62B 5/0033; B62B 5/0076; B62B 5/0083; B62B 3/025; B62B 3/102; B62B 2202/403; B62B 15/009; B62B 5/0046; B63C 113/00; B63C 13/00; B60P 3/10
See application file for complete search history.

(56) References Cited

U.S. PATENT DOCUMENTS

| | | | | |
|---|---|---|---|---|
| 4,492,388 A * | 1/1985 | de Wit | ..................... | B62B 3/027 248/215 |
| 4,824,127 A * | 4/1989 | Stamm | ..................... | B63C 13/00 114/344 |
| 5,265,892 A * | 11/1993 | Said | ......................... | B62B 1/208 280/10 |
| 5,911,422 A * | 6/1999 | Carpenter | ............... | B62B 3/007 280/10 |
| 6,598,898 B2 * | 7/2003 | Chu | .......................... | B62B 1/12 280/47.131 |
| 7,243,928 B2 * | 7/2007 | Singer | ....................... | B62B 1/26 280/40 |

(Continued)

FOREIGN PATENT DOCUMENTS

| | | | | |
|---|---|---|---|---|
| CA | 2290156 A1 * | 5/2001 | ........... | B62B 5/0083 |
| DE | 102010005696 A1 * | 7/2011 | ............... | B60D 1/06 |
| FR | 2736840 A1 * | 1/1997 | ............. | B62B 1/002 |

OTHER PUBLICATIONS

NOMAD Std. Universal Kayak Cart, internet web page retrieved from Internet Wayback Machine, capture dated Sep. 5, 2017; https://maloneautoracks.com/Nomad-TM-Std.-Universal-Kayak-Cart-with-no-flat-tires.html; retrieved Dec. 19, 2018. (Year: 2017).*

(Continued)

*Primary Examiner* — James A Shriver, II
*Assistant Examiner* — Steve Clemmons
(74) *Attorney, Agent, or Firm* — Adamsip, LLC; Stephen Thompson; J. Hunter Adams

(57) ABSTRACT

A motorized kayak cart is provided. The cart has a frame for supporting the hull of a kayak, a motor that drives two opposing wheels mounted on the frame, and stabilizing bars that contact a ground surface on which the cart rests and slides along the ground surface in order to maintain the cart in an upright position when the cart is in motion so that the cart does not tip over when in use.

18 Claims, 5 Drawing Sheets

(56) References Cited

U.S. PATENT DOCUMENTS

| | | | | |
|---|---|---|---|---|
| 7,364,170 | B2* | 4/2008 | Aittama | B62B 13/18 |
| | | | | 280/10 |
| 8,500,075 | B2* | 8/2013 | Frost | B60P 3/1008 |
| | | | | 248/176.1 |
| 8,596,389 | B2* | 12/2013 | Anasiewicz | B62D 51/04 |
| | | | | 180/19.1 |
| 8,814,179 | B1* | 8/2014 | McCormick | B62B 19/02 |
| | | | | 280/10 |
| 9,205,752 | B1* | 12/2015 | Bentz | B60L 11/1816 |
| 9,393,981 | B1* | 7/2016 | Lee | B62B 5/0076 |
| 9,956,976 | B1* | 5/2018 | Akre | B62B 3/002 |
| 2008/0035045 | A1* | 2/2008 | MacDonald | B63C 13/00 |
| | | | | 114/344 |
| 2008/0296855 | A1* | 12/2008 | Roseman | B62B 3/027 |
| | | | | 280/33.993 |
| 2010/0059950 | A1* | 3/2010 | Coghill, Jr. | B62B 1/14 |
| | | | | 280/47.26 |
| 2014/0239605 | A1* | 8/2014 | Cantrell | B62B 5/0083 |
| | | | | 280/35 |
| 2016/0001828 | A1* | 1/2016 | Cates | B62B 5/0033 |
| | | | | 180/9.22 |
| 2017/0129523 | A1* | 5/2017 | Hane | A61H 3/04 |

OTHER PUBLICATIONS

NOMAD Std. Universal Kayak Cart instruction manual; retrieved from https://maloneautoracks.com/pdf/MPG503.pdf on Dec. 19, 2018; revision dated Feb. 2016 (Year: 2016).*

ASI Drives model Mark 400 transaxle, retrieved from https://web.archive.org/web/20160830053733/http://asidrives.com/products/mark400/; dated Aug. 30, 2016 on Internet Archive Wayback Machine (Year: 2016).* stripersonline.com, "Electric Kayak Carts", Web Page, July 7, 2016, available at https://www.stripersonline.com/surftalk/topic/657956-electric-kayak-carts/ (last visited Jun. 18, 2019).

handtrucks2go.com, "Sandhopper Motorized Beach Wagon 24"×48"", Web Page, available at https://handtrucks2go.com/Sandhopper-Motorized-Beach-Cart-2ftx4ft.html (last visited Jun. 18, 2019).

HANDTRUCKS2GO, "Electric Beach Wagon for the Sand", Video, Aug. 1, 2016, available at https://www.youtube.com/watch?time_continue=284&v=ws0OuBuhdxw (last visited Jun. 18, 2019).

* cited by examiner

MOTORIZED KAYAK CART

FIELD OF THE INVENTION

A preferred implementation of the present invention refers generally to a motorized kayak cart.

BACKGROUND

A variety of kayak carts are commercially available to transport kayaks of different sizes and hull dimensions. Kayak carts generally comprise a frame for supporting the hull of the kayak and two opposing wheels on opposite sides of the frame to roll the cart from one location to another. Kayak carts are typically used to haul a kayak from a vehicle or trailer to a launch point in a body of water. However, kayaks may be heavy, particularly when loaded with gear, and so hauling a kayak on a cart may be difficult for a person if the vehicle or trailer cannot be positioned very close to the launch point. In addition, if the terrain is uneven or soft, such as in the case of sand or mud, the amount of work required to haul the kayak on a standard cart may be excessive and inconvenient.

Some attempts have been made to construct motorized kayak carts to reduce the effort required to haul a kayak. However, known motorized carts may still require an excessive amount of work because the user must still support at least one end of the kayak so that the kayak does not fall over either forward or backward, thereby stopping motorized movement of the cart. In the case of heavier kayaks, such as large kayaks typically used in open water, and/or kayaks loaded with heavy gear, supporting the weight of one end of the kayak may still require excessive work, thereby making the hauling process difficult and inconvenient.

Accordingly, a need exists in the art for a motorized kayak cart having two wheels that can be used to haul a kayak without the need of supporting the weight of one end of the kayak.

SUMMARY

In one aspect, a motorized kayak cart is provided. The cart comprises a frame configured to support a hull of a kayak when the cart is in an upright position, a remote-controlled motor operably connected to and configured to drive two opposing wheels mounted on the frame, and a stabilizer secured to the frame and configured to maintain the cart in an upright position when the cart is in motion. Preferably, the stabilizer comprises two spaced parallel stabilizing bars each secured to the frame on opposite sides of the frame. The two bars are arranged so that the bars provide support for the frame to keep the frame in an upright position by contacting a ground surface on which the kayak cart rests. The stabilizing bars slide along the ground surface as the cart moves when transporting a kayak so that the cart stays upright when in motion. The cart preferably has a horizontal crossbar extending between the two stabilizing bars for added support. In a preferred embodiment, the stabilizer additionally comprises a roller attached to each of the stabilizing bars to facilitate the stabilizing bars sliding along the ground surface when in motion. In addition, each roller preferably has a sled secured to the roller. Each sled has a bottom opening, and each roller is positioned within the bottom opening so that the roller contacts the ground surface and the sled facilitates sliding over any uneven surfaces encountered while the cart is in motion. The frame comprises two joints configured to convert the cart into a folded configuration when not in use, which reduces the overall size of the cart so that the cart can be carried or stored more easily when not in use.

To use the kayak cart, the cart is first placed in an upright position on a ground surface, and a kayak is placed onto the frame. The kayak may be strapped to the frame to ensure that the kayak remains secured to the frame during transport. The motor is operated by a remote control that can be held by a user while the user holds one end of the kayak to guide the cart during transport. The user utilizes the remote control to activate the motor to begin rotation of the two wheels. As the cart moves in a forward direction, the stabilizing bars are positioned on a rear end of the cart and contact the ground surface to prevent the cart from tipping over in a backward direction. The user may hold a forward end of the kayak to guide the cart, but the user does not have to support the weight of the forward end of the kayak due to the stabilizing bars providing support. The remote control allows the user to stand at the forward end of the kayak to guide the cart while walking with the cart when the cart is in motion, while also controlling the motor driving the wheels of the cart. Thus, the user may transport a kayak utilizing a two-wheeled, folding, motorized kayak cart without the necessity of supporting the weight of one end of the kayak during use.

The foregoing summary has outlined some features of the device of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purposes of the device disclosed herein. Those skilled in the pertinent art should also realize that such equivalent designs or modifications do not depart from the scope of the systems and methods of the present disclosure.

DESCRIPTION OF THE DRAWINGS

These and other features, aspects, and advantages of the present invention will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
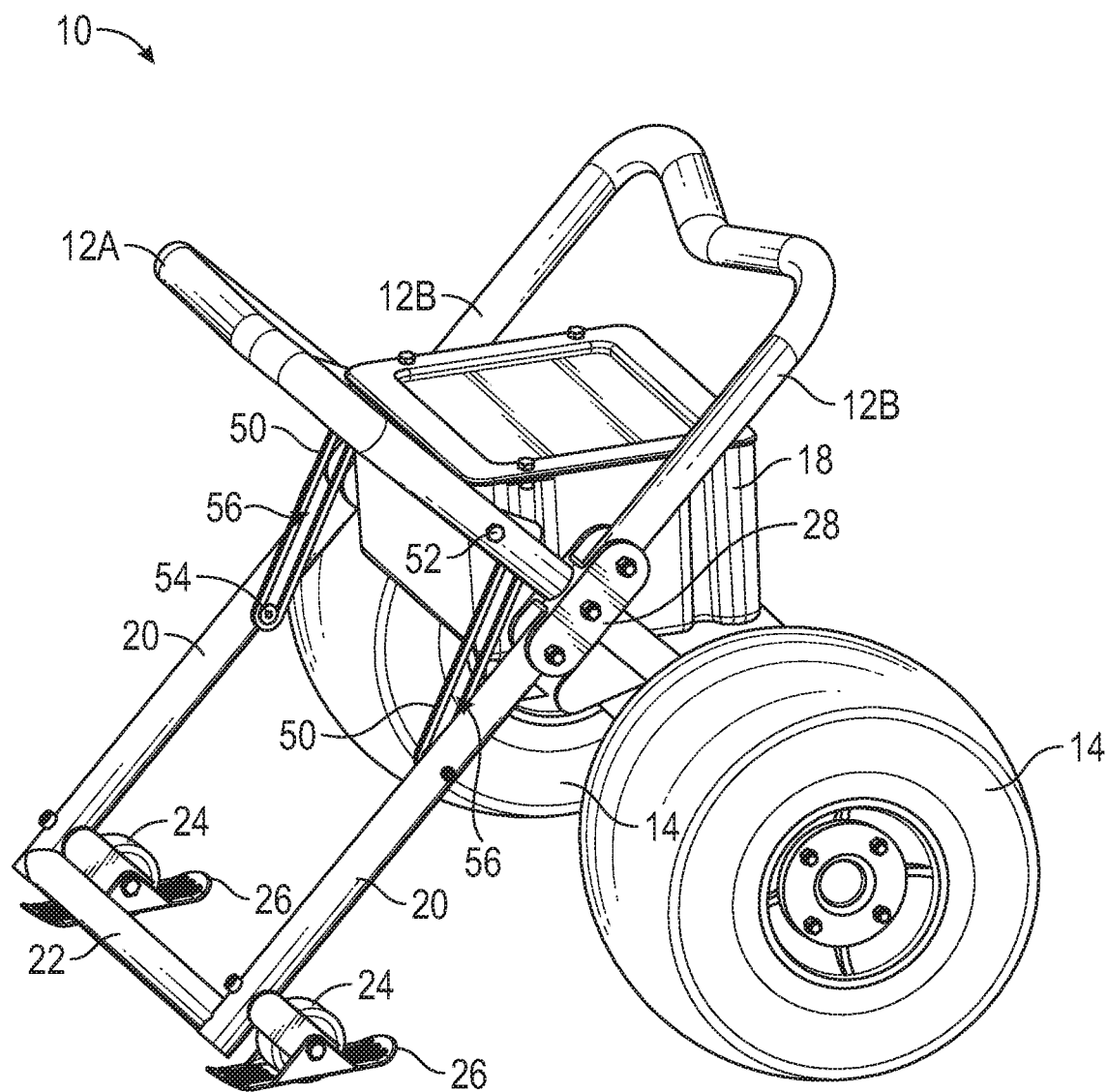
FIG. 1 shows a perspective view of a motorized kayak cart in accordance with the present disclosure.
Figure 2:
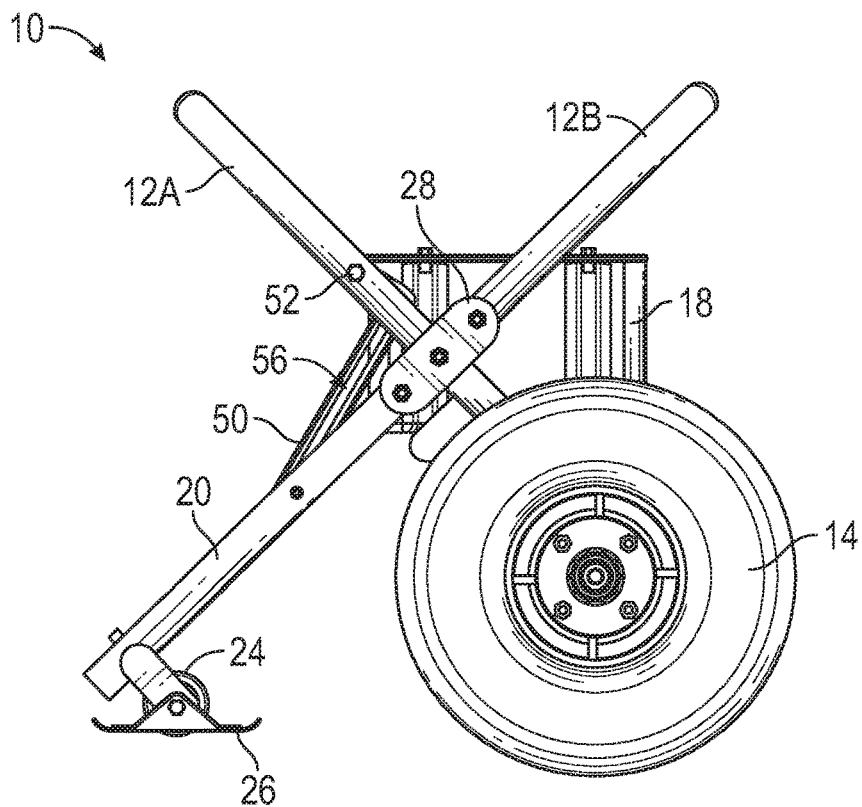
FIG. 2 shows a side elevational view of a motorized kayak cart in accordance with the present disclosure.
Figure 3:
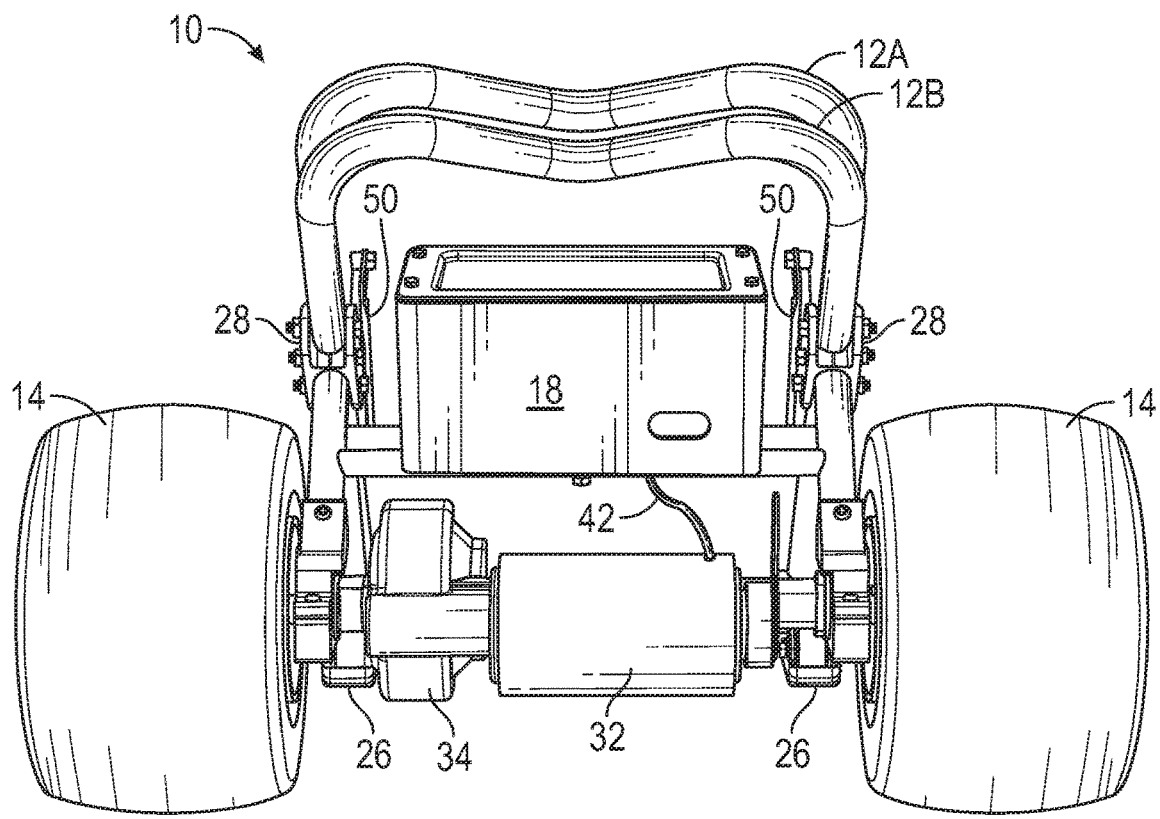
FIG. 3 shows a front perspective view of a motorized kayak cart in accordance with the present disclosure.
Figure 4:
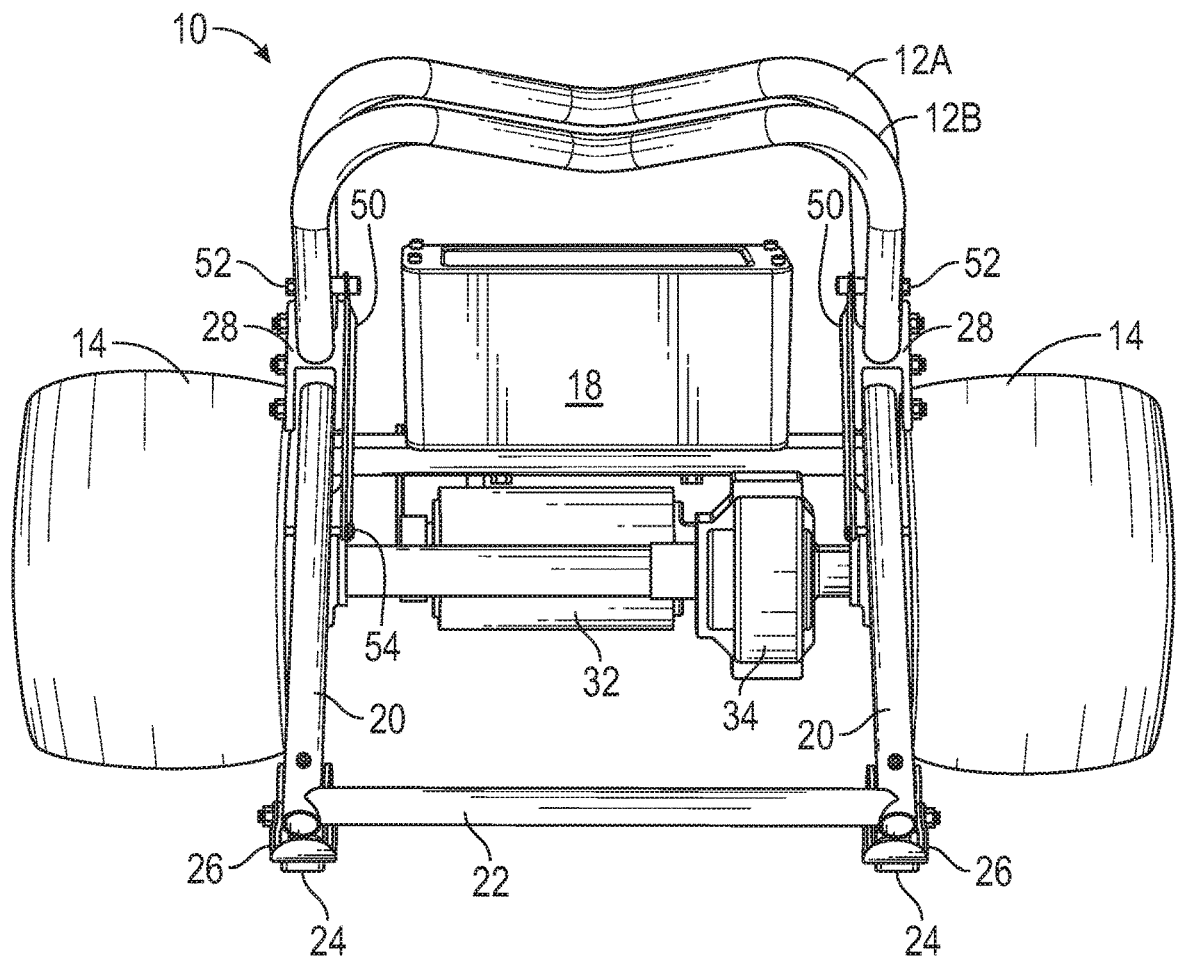
FIG. 4 shows a rear perspective view of a motorized kayak cart in accordance with the present disclosure.
Figure 5:
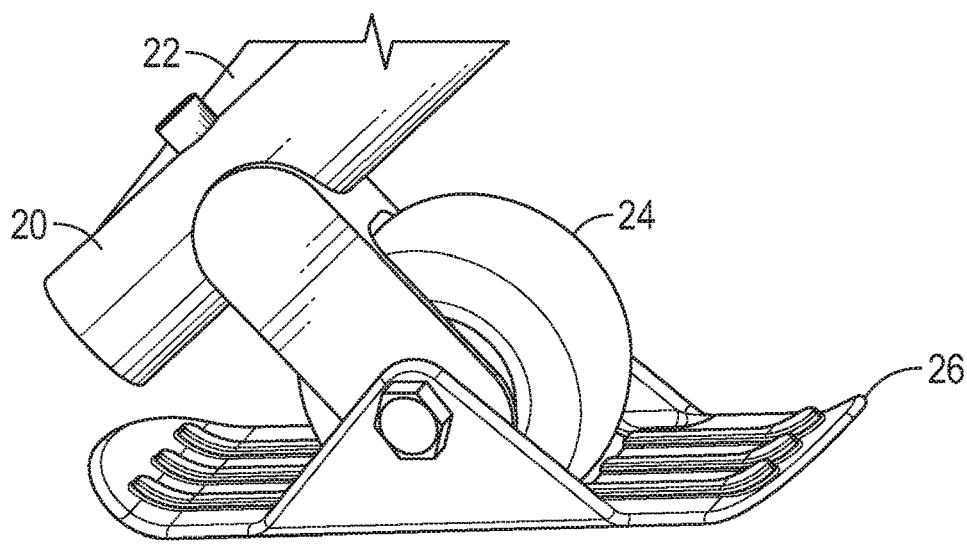
FIG. 5 shows a partial view of a roller attached to a stabilizing bar of a motorized kayak cart in accordance with the present disclosure.
Figure 6:
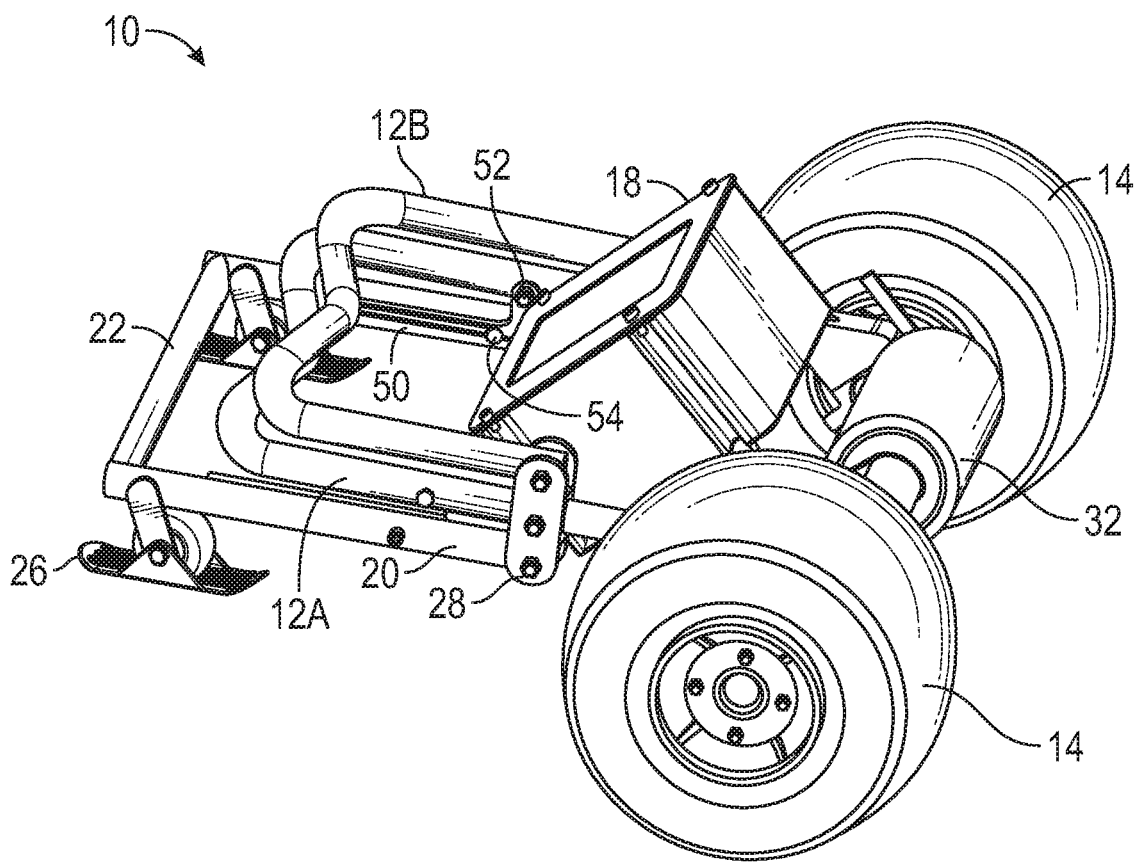
FIG. 6 shows a perspective view of a folded motorized kayak cart in accordance with the present disclosure.

Turning now to the drawings, FIGS. 1-6 illustrate a preferred embodiment of a motorized kayak cart 10 in accordance with the present disclosure. The kayak cart 10 comprises two opposing wheels 14 mounted on a frame 12 configured to support a hull of a kayak when the cart is in an upright position as shown in FIGS. 1 and 2. The frame 12 may comprise two frame members 12A and 12B, which may each be connected to a pair of opposing joints 28 configured to convert the cart 10 into a folded configuration, as shown in FIG. 6, for storage or for carrying the cart when not in use. In a preferred embodiment, as shown in FIG. 1, frame member 12A extends through a central opening in each of the joints 28 and remains in the same relative position regardless of whether the cart 10 is in a folded configuration for storage or an open configuration for use, as shown in FIGS. 1-4. Frame member 12B has two ends that are each rotationally secured to a respective joint 28 so that frame member 12B can be rotated toward frame member 12A to convert the cart to the folded configuration. Preferably, both frame members 12A and 12B have V-shaped crossbar sections aligned with each other when the cart is in an upright position and in the open configuration, as best seen in FIGS. 1 and 3. When in an upright position, the V-shaped crossbar sections are positioned generally in a horizontal plane relative to a ground surface on which the cart rests, as best seen in FIG. 2, and the cart 10 is ready for use in transporting a kayak. The crossbar sections may be V-shaped to accommodate the hull of a variety of different types of kayaks for supporting the hull of a kayak to be transported on the cart 10, though frame members having other shapes may be utilized to support specific types of kayak hulls having varying hull shapes.

Figure 8:
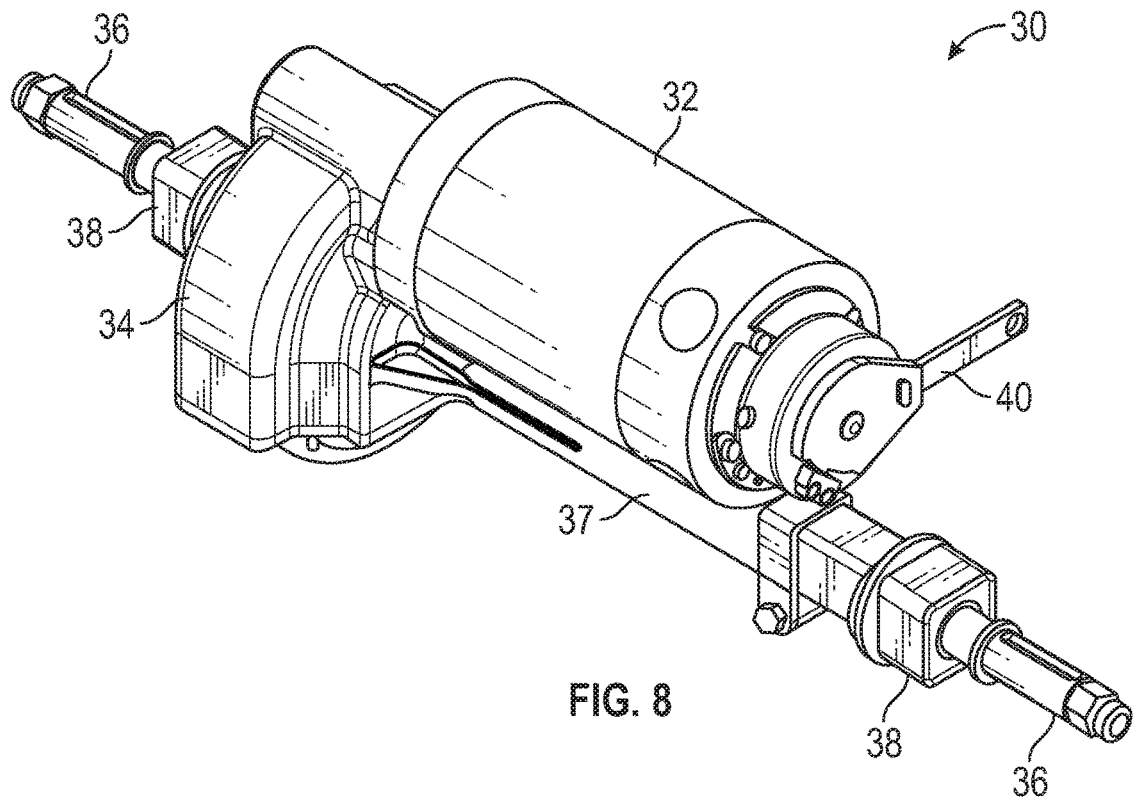
FIG. 8 shows a perspective view of an electric motor and transaxle assembly for use with a motorized kayak cart in accordance with the present disclosure.

The kayak cart 10 further comprises a motor 32 operably connected to and configured to drive the two wheels 14 mounted on the frame 12, as best seen in FIGS. 3 and 4. The motor 32 simultaneously drives both wheels 14 of the cart so that the cart may move in a straight line when in motion. In a preferred embodiment, the motor 32 is a component of a transaxle assembly 30, such as the illustrative transaxle assembly 30 shown in FIG. 8. The transaxle assembly 30 may be a commercially available standard or customized transaxle assembly, such as a model MK400 transaxle assembly available from ASI Technologies, Inc. The transaxle assembly 30 is configured to drive two opposing axles 36 that are each secured to one of the wheels 14. The motor 32 has a driveshaft that is coupled to a gear reduction and differential unit housed inside a gearbox 34. The axles 36 are housed inside of a tube 37 and rotate within the tube 37 when the motor 32 is activated to drive the wheels 14. The tube 37 has two opposing mounting block sections 38 adapted for mounting the transaxle assembly 30 onto frame member 12A of the kayak cart 10, as best seen in FIG. 3. The assembly 30 may optionally include an electro-magnetic brake 40.

Figure 7:
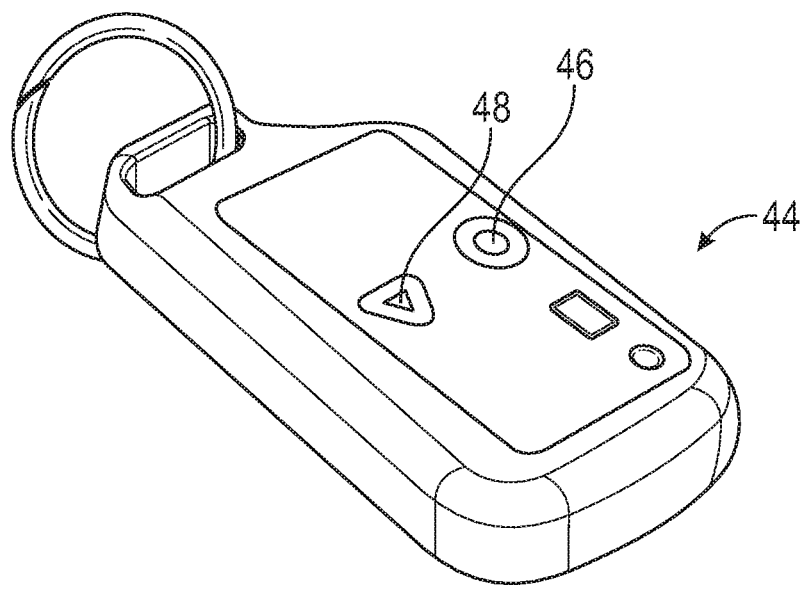
FIG. 7 shows a perspective view of a remote control for use with a motorized kayak cart in accordance with the present disclosure.
Figure 9:
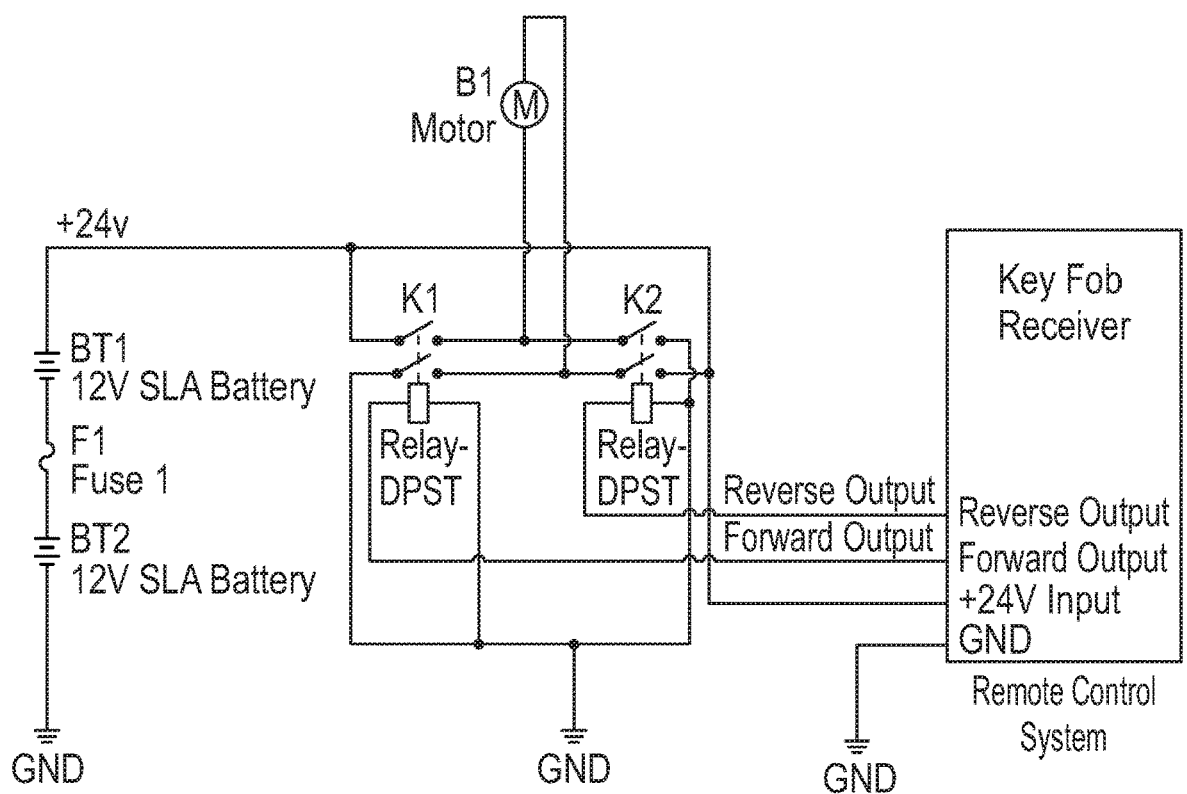
FIG. 9 shows a diagram of a remote control system for use with a motorized kayak cart in accordance with the present disclosure.

The motor 32 is controlled by a remote control system including a remote control 44, as shown in FIG. 7. The kayak cart 10 preferably includes a box 18 mounted to the frame 12 used for storing a battery for powering the motor 32 and the remote control system, a schematic of which is illustrated in FIG. 9. As shown in FIG. 3, a section of conduit 42 connects the box 18 to the motor 32 for encasing wiring between the motor 32 and battery. Preferably, the box 18, including the point at which the conduit 42 is connected to the box 18, is water-resistant to reduce any amount of moisture coming into contact with the components housed inside the box 18. In a preferred embodiment, the box 18 may be waterproof once closed.

The remote control 44 allows a user to operate the motor 32 while standing at one end of a kayak supported by the frame 12 of the cart 10 in order to guide the cart when in motion. In a preferred embodiment, as shown in FIG. 7, the remote control 44 is a wireless transmitter, though the control 44 may be wired to the remote control system with a wire of sufficient length to allow the user to stand at one end of the kayak and operate the motor. A wireless receiver may be stored inside the box 18 and operably connected to the remote control system to wirelessly communicate with the transmitter 44. In a preferred embodiment, the remote control 44 is configured to operate the motor 32 in a forward direction and in a reverse direction. As shown in FIG. 9, the remote control system preferably has two relays for forward and reverse output, which may be DPST (double pole single throw) relays. As also shown in FIG. 9, two 12-volt SLA (sealed lead acid) batteries may be utilized as a power source, although other suitable batteries may be utilized to power the motor 32 and remote control system. As shown in FIG. 7, the remote control 44 may have a forward button 46 for operating the motor 32 in a forward direction and a reverse button 48 for operating the motor 32 in a reverse direction. The remote control system may be a commercially available system adapted for the present application, such as a WASP-S2 remote control system available from RF Solutions, Ltd.

The kayak cart 10 further comprises a stabilizer secured to the frame 12 and configured to maintain the cart 10 in an upright position when the cart is in motion. The stabilizer provides at least two spaced contact points that are located on opposite sides of the frame 12 and that contact a ground surface on which the cart 10 rests in order to provide stability for the cart when the cart is in motion. Preferably, as best seen in FIGS. 1 and 2, the stabilizer comprises two spaced parallel stabilizing bars 20 each secured to the frame 12 on opposite sides of the frame 12. The stabilizing bars 20 may be secured to the frame 12 by securing each stabilizing bar 20 to a respective joint 28 to which frame members 12A and 12B are secured. When the cart 10 is in an open configuration, the two stabilizing bars 20 are arranged so that the bars 20 provide support for the frame 12 to keep the kayak cart 10 in an upright position by contacting the ground surface and sliding along the ground surface on which the wheels 14 of the cart are rolling. As shown in FIG. 1, a horizontal crossbar 22 preferably extends between the two stabilizing bars 20 for added support.

In a preferred embodiment, the stabilizer additionally comprises a roller 24 attached to each of the stabilizing bars 20. In addition, each roller 24 preferably has a sled 26 secured thereto. As best seen in FIGS. 2 and 5, each sled 26 has a bottom opening therein, and each respective roller 24 is positioned within the bottom opening so that the sled 26 surrounds the roller 24. The sled 26 is positioned near a bottom of the roller 24 so that a relatively small portion of the roller 24 is disposed below a bottom surface of the sled 26, as best seen in FIG. 2. Each roller 24 and sled 26 may be secured to a respective stabilizing bar 20 via a bracket and fastener, as shown in FIG. 1. When the kayak cart 10 is in motion for transporting a kayak, each roller 24 and sled 26 combination provides the contact points that contact the ground surface on which the cart rests and slide along the ground surface so that the cart 10 stays upright when in motion. Thus, the rollers 24 and sleds 26 secured to the stabilizing bars 20 facilitate the stabilizing bars 20 sliding along the ground surface when in motion so that the stabilizing bars stabilize the cart in an upright position, thereby preventing the cart 10 from tipping over. The rollers 24 rotate as they roll along the ground surface, while the sleds 26 facilitate sliding over any uneven surfaces encountered while the cart is in motion. Each sled 26 has a bottom surface that may contact the ground surface and preferably has upwardly sloped ends on a forward and a backward end of the sled 26 to help the sled move over uneven surfaces.

In an alternative embodiment, the stabilizing bars 20 may have only rollers 24 without attached sleds 26, or may have only sleds 26 without rollers 24, in which case the sleds 26 preferably do not have bottom openings. In another alternative embodiment, the stabilizer may comprise a single stabilizing bar attached to a horizontal crossbar with rollers and/or sleds attached to opposite ends of the crossbar to provide contact points on opposite sides of the cart.

The two joints 28 of the frame 12 are configured to convert the cart 10 into a folded configuration when not in use, as shown in FIG. 6, which reduces the overall size of the cart so that the cart can be carried or stored more easily. To fold the cart, the two stabilizing bars 20 may be simultaneously folded toward frame member 12A. In a preferred embodiment, the cart 10 comprises two brackets 50. Each bracket 50 is rotatably attached to an opposing side of frame member 12A and slidably attached to a respective one of the stabilizing bars 20. Each bracket 50 may be attached to frame member 12A by a fastener 52 so that the bracket 50 may rotate about the fastener 52 when the cart is converted between folded and open configurations. As shown in FIG. 1, each bracket 50 has an elongated slot 56 along a length of the bracket 50. The bracket 50 may be slidably secured to each of the stabilizing bars 20 via a protrusion 54 extending from each stabilizing bar 20. The protrusion 54 extends through the slot 56 of the bracket 50 and has an enlarged head that prevents removal of the bracket 50, thereby securing the bracket 50 to the stabilizing bar 20. The protrusion 54 may slide along the length of the slot 56 when the cart is converted between folded and open configurations. As shown in FIG. 1, the protrusion 54 is positioned at one end of the slot 56 when the cart is in the open configuration, and the protrusion 54 is positioned at an opposing end of the slot 56 when the cart is in the folded configuration, as seen in FIG. 6.

The bracket 50 may be configured to lock the protrusion 54 in a fixed position when the cart is in the open configuration in order to prevent the stabilizing bars 20 from folding when the cart is in use, thereby ensuring that the stabilizing bars 20 function properly in maintaining the cart in an upright position. The slot 56 may have notches near the ends of the slot 56 so that the protrusion 54 may be locked in place at either end. Force may be applied to the stabilizing bars 20 to unlock the protrusions 54 and allow the protrusions 54 to slide from one end of the slot 56 to the other for converting the cart between folded and open configurations.

To use the kayak cart, the cart 10 is first placed in an upright position on a ground surface, and a kayak is placed onto the top of the crossbar sections of the frame 12. The kayak may be strapped to the frame 12 to ensure that the kayak remains secured to the frame during transport. The motor 32 is operated by the remote control 44, which may be held by a user while the user holds one end of the kayak to guide the cart 10 during transport. The user generally holds a forward-facing end of the kayak positioned at a front end of the cart 10. The forward-facing end of the kayak may be the front or rear end of the kayak, depending on the orientation of the kayak when placed on the cart. The user utilizes the remote control 44 to activate the motor 32 to begin rotation of the two wheels 14. As the cart 10 moves in a forward direction, the stabilizing bars 20 are positioned on a rear end of the cart so that the rollers 24 and sleds 26 contact the ground surface and slide along the ground surface to prevent the cart from tipping over in a backward direction. FIG. 4 illustrates a view of the cart from the rear end, while FIG. 3 illustrates a view of the cart from the front end. The user may hold the forward end of the kayak to guide the cart, but the user does not have to support the weight of the forward end of the kayak due to the stabilizing bars 20 providing support. The remote control 44 allows the user to stand at the forward end of the kayak to guide the cart while walking with the cart 10 when the cart is in motion while also controlling the motor 32 driving the wheels 14 of the cart. Thus, the stabilizing bars 20 eliminate the necessity of supporting the weight of one end of the kayak during transportation on the cart.

The user may also operate the cart in a reverse direction. Because the stabilizing bars 20 are positioned at the rear end of the cart, the reverse direction is generally not used for transporting the kayak for long distances and is generally only used to reverse for short distances to re-position the kayak to change directions or to navigate tight spaces.

It is understood that versions of the present disclosure may come in different forms and embodiments. Additionally, it is understood that one of skill in the art would appreciate these various forms and embodiments as falling within the scope of the invention as disclosed herein.

What is claimed is:

1. A motorized kayak cart, comprising:
    a frame configured to support a hull of a kayak when the kayak cart is in an upright position, wherein the frame comprises a first frame member integrally formed as a unitary structure, a second frame member, and two opposing joints configured to convert the kayak cart between an open configuration and a folded configuration, wherein the second frame member is rotably secured to each joint of the two opposing joints;
    a transaxle assembly mounted onto two opposing ends of the first frame member and configured to drive two opposing axles, wherein each axle of the two opposing axles has a wheel secured thereto and the transaxle assembly is controllable, at least in part, by a remote control; and a stabilizer rotatably secured to each joint and configured to maintain the kayak cart in an upright position when the kayak cart is in motion and in the open configuration, wherein the first frame member retains the same shape in both the open configuration and the folded configuration, and wherein the second frame member and the stabilizer are both positioned parallel to the first frame member when the kayak cart is in the folded configuration.

2. The kayak cart of claim 1, wherein the stabilizer comprises two parallel stabilizing bars each rotatably secured to the frame.

3. The kayak cart of claim 2, wherein the stabilizer further comprises a crossbar attached at each end to one of the two stabilizing bars.

4. The kayak cart of claim 3, wherein the stabilizer further comprises two rollers, wherein each roller is attached to one of the stabilizing bars.

5. The kayak cart of claim 4, wherein each roller has a sled secured thereto, wherein the sled has a bottom opening therein, and wherein each roller is positioned within the bottom opening.

6. The kayak cart of claim 3, wherein each stabilizing bar has a sled secured thereto.

7. The kayak cart of claim 2, wherein the stabilizer further comprises two rollers, wherein each roller is attached to one of the stabilizing bars.

8. The kayak cart of claim 7, wherein each roller has a sled secured thereto, wherein the sled has a bottom opening therein, and wherein each roller is positioned within the bottom opening.

9. The kayak cart of claim 2, wherein each stabilizing bar has a sled secured thereto.

10. The kayak cart of claim 1, wherein the remote control is a wireless remote.

11. The kayak cart of claim 1, wherein the transaxle assembly includes a single motor configured to simultaneously drive rotation of each axle of the two opposing axles when activated.

12. The kayak cart of claim 11, wherein the remote control is configured to operate the motor in a forward direction and in a reverse direction.

13. The kayak cart of claim 11, further comprising a battery operably connected to the single motor, wherein the battery is disposed above each axle of the two opposing axles when the kayak cart is in an upright position.

14. A motorized kayak cart, comprising:
a frame including a first frame member integrally formed as a unitary structure, a second frame member, and two opposing joints configured to convert the kayak cart between an open configuration and a folded configuration, wherein the first frame member retains the same shape in both the open configuration and the folded configuration and the second frame member is rotably secured to each joint of the two opposing joints;
a transaxle assembly mounted onto two opposing ends of the first frame member, wherein the transaxle assembly includes a remote controlled motor operably connected to and configured to drive two opposing wheels secured to the transaxle assembly; and
a stabilizer rotably secured to each joint of the two opposing joints and configured to maintain the kayak cart in an upright position when the kayak cart is in the open configuration and in motion,
wherein the second frame member and the stabilizer are both positioned parallel to the first frame member when the kayak cart is in the folded configuration.

15. The kayak cart of claim 14, wherein the first frame member extends through a central opening in each joint of the two opposing joints.

16. The kayak cart of claim 14, wherein the stabilizer comprises two parallel stabilizing bars each rotatably secured to the frame.

17. The kayak cart of claim 16, wherein the stabilizer further comprises two rollers, wherein each roller is attached to one of the stabilizing bars.

18. The kayak cart of claim 17, wherein each roller has a sled secured thereto, wherein the sled has a bottom opening therein, and wherein each roller is positioned within the bottom opening.

* * * * *